United States Patent
de Waal et al.

(10) Patent No.: US 7,626,587 B1
(45) Date of Patent: Dec. 1, 2009

(54) METHOD AND APPARATUS FOR DISPLAYING IMAGE DATA OF A VIRTUAL DESKTOP FROM ONE OR MORE FRAME BUFFERS ONTO A DISPLAY SCREEN

(75) Inventors: Abraham B. de Waal, San Jose, CA (US); Walter E. Donovan, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 660 days.

(21) Appl. No.: 11/030,223

(22) Filed: Jan. 6, 2005

Related U.S. Application Data

(62) Division of application No. 10/288,601, filed on Nov. 5, 2002, now Pat. No. 7,477,205.

(51) Int. Cl.
*G06F 13/00* (2006.01)
(52) U.S. Cl. .................. 345/536; 345/1.1; 345/506; 345/545; 345/548; 345/682; 382/295; 382/298; 715/778
(58) Field of Classification Search .............. 345/548, 345/682; 715/778
See application file for complete search history.

(56) References Cited

U.S. PATENT DOCUMENTS

| 4,648,050 | A | 3/1987 | Yamagami |
|---|---|---|---|
| 4,910,683 | A | 3/1990 | Bishop et al. |
| 5,001,469 | A | 3/1991 | Pappas et al. |
| 5,065,343 | A | 11/1991 | Inoue |
| 5,224,210 | A * | 6/1993 | Pinedo et al. ............... 345/501 |
| 5,625,386 | A | 4/1997 | Howard et al. |
| 5,831,638 | A | 11/1998 | West et al. |
| 5,945,974 | A | 8/1999 | Sharma et al. |

(Continued)

OTHER PUBLICATIONS

University of Massachusetts, Department of Computer Science, "Acceptable Use Policy", pp. 1-4 and 1 of 1, downloaded from the Internet on Oct. 4, 2002 from http://www.ediab.cs.umass.edu and http://www-edlab.cs.umass.edu/unixroot.html.

(Continued)

*Primary Examiner*—Antonio A Caschera
(74) *Attorney, Agent, or Firm*—Patterson & Sheridan, LLP

(57) ABSTRACT

A computer system including a processor, a display, and a graphics unit coupled between the processor and the display, in which the processor is configured to perform multi-display operations which generate multiple frames of display data for simultaneous display, and a graphics unit for use in such a system. Typically, the graphics unit includes graphics memory that includes at least two frame buffers, and the processor operates as if it were independently asserting multiple streams of display data to multiple frame buffers for driving multiple displays independently. Another aspect of the invention is a system that displays data from a frame buffer on a screen. The frame buffer holds data indicative of a virtual desktop that is larger than can be displayed on the screen or available portion thereof, the system can display on the screen any of a number of different subsets of the frame buffer data, each subset indicative of a different portal of the desktop, and the system includes a processor including texture processing circuitry operable to filter a subset of the frame buffer data that is indicative of a portal to be displayed.

17 Claims, 2 Drawing Sheets

U.S. PATENT DOCUMENTS

| | | | |
|---|---|---|---|
| 5,956,046 | A | 9/1999 | Kehlet et al. |
| 6,157,374 | A | 12/2000 | West et al. |
| 6,411,302 | B1 | 6/2002 | Chiraz |
| 6,445,400 | B1 | 9/2002 | Maddalozzo et al. |
| 6,501,441 | B1 | 12/2002 | Ludtke et al. |
| 6,587,128 | B2 | 7/2003 | Kanevsky et al. |
| 6,628,291 | B1 | 9/2003 | Edrington et al. |
| 6,650,323 | B2 | 11/2003 | Naegle et al. |
| 6,661,427 | B1 | 12/2003 | MacInnis et al. |
| 6,833,834 | B2 * | 12/2004 | Wasserman et al. ......... 345/537 |
| 6,882,346 | B1 | 4/2005 | Lefebvre et al. |
| 6,924,807 | B2 | 8/2005 | Ebihara et al. |
| 7,010,755 | B2 * | 3/2006 | Anderson et al. ............ 715/778 |
| 7,194,697 | B2 * | 3/2007 | Sinclair et al. .............. 715/800 |
| 7,197,718 | B1 | 3/2007 | Westerman et al. |
| 7,266,148 | B2 | 9/2007 | Kim |

OTHER PUBLICATIONS

University of Massachussetts, Department of Computer Science, "Virtual Window Manager for X11", p. 1 of 1, downloaded from the Internet on Sep. 30, 2002 from http://www.edlab.cs.umass.edu/uniroot/node85.html.

Hewlett Packard. "Chapter 3: X Windows: hp 11.0", pp. 1-39, downloaded from the Internet on Sep. 3, 2002 from http://www.hp.com/workstations/support/documentation/manuals/user_guides/graphics/G...

StarNet Communications, "X-Win32: Fast, Friendly and Affordable", pp. 1-5, Downloaded from the Internet on Sep. 3, 2002 from http://www/starnet.com/products/.

* cited by examiner

METHOD AND APPARATUS FOR DISPLAYING IMAGE DATA OF A VIRTUAL DESKTOP FROM ONE OR MORE FRAME BUFFERS ONTO A DISPLAY SCREEN

CROSS-REFERENCE TO RELATED APPLICATION(S)

This application is a divisional of, and claims the priority benefit of, U.S. patent application Ser. No. 10/288,601, entitled "METHOD AND APPARATUS FOR DISPLAYING DATA FROM MULTIPLE FRAME BUFFERS ON ONE OR MORE DISPLAY DEVICES," filed Nov. 5, 2002 now U.S. Pat. No. 7,477,205. The subject matter of the related application is incorporated by reference as though fully set forth herein.

TECHNICAL FIELD OF THE INVENTION

The invention pertains to computer systems in which data from multiple frame buffers are displayed (or filtered or otherwise processed and then displayed) simultaneously on a single display device. The invention also pertains to graphics memory and processing units for use in such systems.

BACKGROUND OF THE INVENTION

The following expressions will be used herein, including in the claims, with the indicated definitions:

"frame buffer" denotes an area in a memory that holds a frame of data to be displayed on a display device (e.g., a CRT or flat panel display device). Typically, a frame buffer contains the data that determine a computer's "desktop." In some embodiments of the invention, only a subset of the data in a frame buffer are displayed on the screen of a display device. For example, a subset of the data in a frame buffer can determine a "portal" (a part of a desktop) and the system is capable of displaying only the portal on the screen. For another example, the frame buffer contains more data than can be displayed on the screen of a display device, and the system is capable of downsampling or otherwise filtering the data in the frame buffer and displaying the filtered (e.g., downsampled) data on the screen or a portion of the screen. A graphics memory can include one or more frame buffers;

"graphics memory" denotes any memory that is coupled to a graphics processor. Typically, graphics memory stores display data (in a frame buffer or in each of at least two frame buffers), and also stores other data such as texture data, graphics shading programs, and/or display lists;

"window" denotes an area within a frame buffer. Typically, each window in a frame buffer corresponds to one application program running on a computer system (and holds data generated in accordance with such program); and "simultaneous" display of data denotes display of the data such that a viewer perceives the data as being displayed simultaneously, even if the data are not all asserted to the display device simultaneously or if the display device does not simultaneously emit light indicative of all pixels determined by the data.

SUMMARY OF THE INVENTION

In a class of embodiments, the invention is a computer system including a processor, a display device, and a graphics unit coupled between the processor and display device, in which the processor is configured to operate in a mode to perform multi-display operations which generate multiple frames of display data for simultaneous display. The graphics unit includes at least one graphics memory that includes at least two frame buffers. The processor can be a central processing unit (CPU) in combination with at least one graphics processor (with each graphics processor coupled to receive data from the CPU and configured to generate display data in response thereto and to assert the display data to at least one of the frame buffers), or the processor can be one such graphics processor, or two or more such graphics processors. Each of the frame buffers can be a different area of a single graphics memory or at least two of the frame buffers can be areas of different graphics memories. The processor operates as if it were independently asserting two or more streams of display data to two or more frame buffers for driving at least two display devices independently. In preferred embodiments, the computer system's operating system operates as it would if two display devices were attached to the graphics unit, when in fact there is only one.

Preferably, the graphics unit recognizes and distinguishes between the condition that one display device is attached to the graphics unit (in which case, data from at least two frame buffers are displayed on one display device), and the condition that at least two display devices are attached to the graphics unit (in which case the graphics unit can operate in a mode in which each display device displays data from a different frame buffer). In the typical case that the graphics unit is an element of a system that also includes a CPU (having an operating system) and a graphics processor distinct from the graphics unit, the operating system and graphics processor "see" the same frame buffers under both of these conditions (in the sense that the operating system and graphics processor operate in the same way under both conditions).

Preferably, the graphics unit includes circuitry (which operates when only one display device is coupled to the graphics unit) for combining display data from each of two or more frame buffers for display on a single screen. Using such circuitry, data from different frame buffers are displayed on different regions of the screen. Preferably, under software control, data from the frame buffers can be displayed in various relative positions (e.g., side by side or in background-foreground relation with any of them in the foreground) or data can be displayed from only one of the frame buffers at a time.

In some embodiments of the inventive system, a processor and graphics unit are configured to respond to an operating system alert by causing an indication of the alert to be displayed, either by automatically overlaying the alert indication on whatever is being displayed, or by causing the displayed image to pan to the alert indication (or otherwise causing sequential display of different portions of the image, with all or some of the later-displayed portions including the alert indication). In some cases (e.g., in some cases when two or more display devices are coupled to the graphics unit), the processor and graphics unit respond to an operating system alert by causing an alert indication to be displayed on one display screen in the position specified by the operating system. Alternatively, the indication of the alert is displayed in a position different from that specified by the operating system (e.g., when only one display device is coupled to the graphics unit, data indicative of the alert indication are written to a frame buffer that is not currently being viewed by the user, and the alert indication is then displayed on the screen in a position different from that specified by the operating system).

In some embodiments, the invention is a system that is operable in a mode in which graphics memory usage is automatically reduced (and preferably minimized) by causing at least one frame buffer to be no larger (or not significantly larger) than necessary to hold data that can be displayed on a display screen (or an available portion of a display screen). Typically, after the graphics memory of the system has defined two or more frame buffers, the graphics unit can enter an operating mode in which the available display screen portion for a frame buffer (the screen portion available for displaying data determined by the frame buffer) is so small that only some of the data in the frame buffer can be displayed on the available display screen portion. The system preferably includes hardware and/or software (e.g., circuitry in the graphics unit) that filters (e.g., downsamples) display data produced by the processor to reduce the volume of such data, and asserts the filtered data to a "reduced size" frame buffer (from which the filtered data can be asserted for display on the available display screen portion). The "reduced size" frame buffer occupies less space in the graphics memory than would a frame buffer capable of holding the original, non-filtered display data.

In some embodiments, at least one of the frame buffers of the inventive system holds display data indicative of a virtual desktop that is larger than can be displayed on a display screen (or the available portion of a display screen) and the system is capable of displaying on the screen any of a number of different selected subsets of the data in each such frame buffer (each subset being indicative of a "portal" of the desktop). Preferably, the system is configured to display different portions of the virtual desktop by "zooming in" to display a magnified version of a smaller portion of the virtual desktop on an area of the screen, or "zooming out" to display a smaller scale (and typically lower-resolution) version of a larger portion of the virtual desktop in the same area of the screen. In some implementations, the system can resize (i.e., shrink) the entire desktop to fit on the screen (or available portion of the screen). Displayed texture can be scaled in any of a variety of ways. In some implementations, the processor has texture processing capability, and this capability is used to filter (e.g., downsample) each subset of the frame buffer data that is indicative of a portal to be displayed. The resulting filtered data (which are typically indicative of a magnified or downsampled version of the data subset from the frame buffer) are displayed. In some implementations, while viewing a portal of a virtual desktop, the user can select any of a number of pre-defined "snap to" locations in the virtual desktop, causing another portal of the desktop (including a "snap to" location) to be displayed. This allows the user to maneuver quickly within the virtual desktop.

In some implementations, the user can cause a de-magnified version of the entire virtual desktop to appear in an area of the screen (e.g., as a "popup window"), and can then select a location for a portal of the desktop (to be displayed) by selecting a region within the de-magnified version of the entire desktop. More generally, in some embodiments of the inventive system, the graphics unit is (or the processor and graphics unit are) configured to respond to selection of a feature of a windowing system by resizing a displayed portal or displaying a different portal. In some implementations that include graphics memory that defines multiple frame buffers, the system includes at least one user-definable control (e.g., at least one keyboard key having a programmed function selected from a set of programmable functions) and a processor and graphics unit configured to respond to selection of one said control by automatically changing characteristics of a displayed image (from one of the frame buffers) to a set of predefined characteristics. For example, a particular control can cause the display of a portal at a particular location within the virtual desktop. Another control can cause the size of a displayed portal to change. Preferably, the user can specify a list of portal sizes and locations, and each item in the list is invoked using a control (e.g., using a "shortcut" implemented by a combination of keystrokes or a selection from a popup menu).

In another class of embodiments, the inventive system displays data from a single frame buffer on a display screen, the frame buffer holds display data indicative of a virtual desktop that is larger than can be displayed on the screen, the system is capable of displaying on the screen any of a number of different selected subsets of the data in the frame buffer (each two subsets being indicative of different portals of the desktop or differently sized versions of a portal of the desktop), the system includes a processor including texture processing circuitry, and the texture processing circuitry can be employed to filter (e.g., downsample) a subset of the frame buffer data that is indicative of a portal to be displayed. The resulting filtered data (which are typically indicative of a magnified or downsampled version of the subset of the frame buffer data) are displayed.

In another class of embodiments, the inventive system displays data from a single frame buffer on a display screen, the frame buffer holds display data indicative of a virtual desktop that is larger than can be displayed on the screen, the system is capable of displaying on the screen any of a number of different selected subsets of the data in the frame buffer (each subset being indicative of a different portal of the desktop), and while viewing a portal of the virtual desktop, the user can select any of a number of pre-defined "snap to" locations in the virtual desktop, causing another portal of the desktop (including a "snap to" location) to be displayed. This allows the user to maneuver quickly within the virtual desktop.

In another class of embodiments, the inventive system displays data from a single frame buffer on a display screen, the frame buffer holds display data indicative of a virtual desktop that is larger than can be displayed on the screen, the system is capable of displaying on the screen any of a number of different selected subsets of the data in the frame buffer (each two subsets being indicative of different portals of the desktop or differently sized versions of a portal of the desktop), and the user can cause a de-magnified version of the entire virtual desktop to appear in an area of the screen (e.g., as a "popup window") and can then select a location for a portal of the desktop (to be displayed) by selecting a region within the de-magnified version of the entire desktop.

In another class of embodiments, the inventive system displays data from a single frame buffer on a display screen, the frame buffer holds display data indicative of a virtual desktop that is larger than can be displayed on the screen, the system is capable of displaying on the screen any of a number of different selected subsets of the data in the frame buffer (each two subsets being indicative of different portals of the desktop or differently sized versions of a portal of the desktop), and the system includes a processor and graphics unit configured to respond to selection of a feature of a windowing system by resizing a displayed portal or displaying a different portal. For example, the system can automatically display a sequence of progressively larger portals when the user "presses" a cursor against an edge of the region on the screen (e.g., popup window) in which a portal is displayed. As another example, when the user scrolls within a screen region in which a portal is displayed, a sequence of different portals are displayed with the appearance that the displayed portal is moving to a part of the desktop to which the user is scrolling.

In another class of embodiments, the inventive system displays data from a single frame buffer on a display screen, the frame buffer holds display data indicative of a virtual desktop that is larger than can be displayed on the screen, the system is capable of displaying on the screen any of a number of different selected subsets of the data in the frame buffer (each two subsets being indicative of different portals of the desktop or differently sized versions of a portal of the desktop), and the system also includes at least one user-definable control (e.g., at least one keyboard key having programmable functions) and a processor and graphics unit configured to respond to selection of one of the controls by automatically changing characteristics of a displayed image (from one of the frame buffers) to a set of predefined characteristics.

DETAILED DESCRIPTION OF THE PREFERRED EMBODIMENTS

Figure 1:
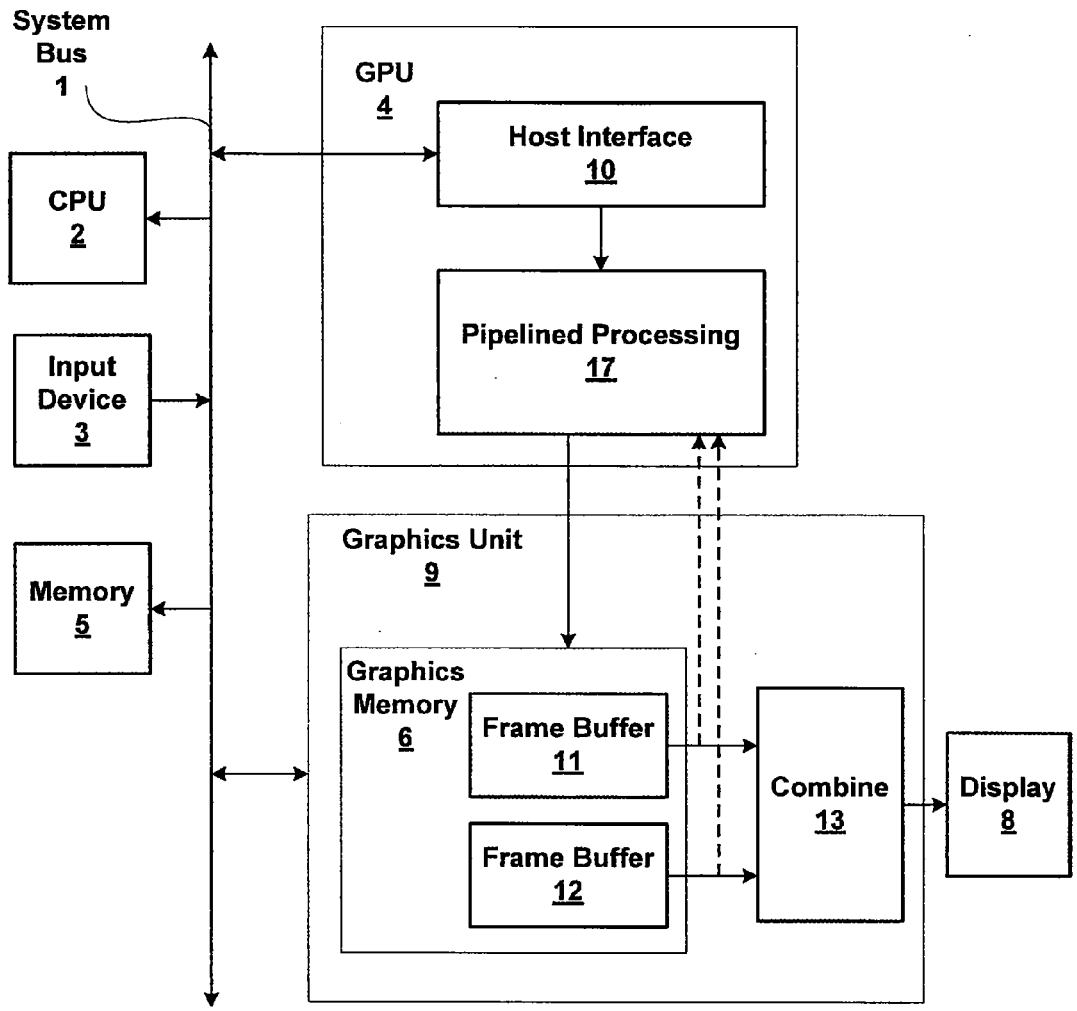
FIG. 1 is a block diagram of a system that embodies the invention.

The invention can be implemented in a computer system to enable the system to display multiple frames of data simultaneously on a display device. FIG. 1 is a block diagram of a typical computer system that embodies the invention. The FIG. 1 system includes system bus 1, central processing unit (CPU) 2, pipelined graphics processor (GPU) 4, input device 3, memory 5, graphics unit 9 (including graphics memory 6), and display device 8, connected as shown. Display device 8 is typically a liquid crystal (or other flat panel) display or cathode ray tube monitor. GPU 4 is coupled to system bus 1 via host slave interface 10. In response to input data received over the system bus, pipelined processing circuitry 17 in GPU 4 generates video data for display by device 8. Circuitry 17 can include a vertex processor (for generating vertex data indicative of the coordinates of the vertices of each primitive of each image to be rendered and attributes of each vertex), a rasterizer (for generating pixel data in response to the vertex data), and pixel processing circuitry for applying textures to and otherwise processing the pixel data from the rasterizer. The video data output from circuitry 17 are asserted to one or more frame buffers in graphics memory 6. Consecutive frames of the video data can be asserted by graphics memory 6 through frame combining circuitry 13 to display device 8.

Control circuitry (not shown) within GPU 4 controls operation of pipelined processing circuitry 17 and other elements of GPU 4.

GPU 4 is typically implemented as an integrated circuit (chip), as a graphics processing portion of a chip (sometimes referred to as a graphics "core" or "core portion"), or as two or more chips. Typically, both GPU 4 and graphics unit 9 are implemented as separate chips (or portions of separate chips) of a graphics card. Alternatively, both graphics memory 6 and graphics unit 9 can be implemented as elements of a single chip.

In accordance with the invention, the FIG. 1 system includes graphics unit 9 which in turn includes graphics memory 6 and frame combining circuitry 13. Frame buffer 11 and frame buffer 12 are distinct areas in graphics memory 6. Memory 6 optionally also includes frame buffers in addition to frame buffers 11 and 12. Graphics unit 9 can assert at least a subset of each frame of data in each frame buffer of memory 6 to display device 8 for display on display device 8's screen. Graphics unit 9 can be implemented as a pipelined processor that generates display data to be stored in frame buffers of memory 6.

GPU 4 operates as if it were independently asserting N streams (where N≧2) of display data to N frame buffers for driving N display devices independently, even when the system includes only one display device (device 8) and displays data from all the frame buffers simultaneously on the single display device. In preferred embodiments, CPU 2's operating system causes CPU 2 to assert the same data and commands to GPU 4 that it would assert to GPU 4 if two or more display devices were attached to graphics unit 9 and CPU 2 intended that GPU 4 generate a different stream of display data for driving each display device independently, even when the system includes only one display device and displays data from all frame buffers of unit 9 simultaneously on the single display device.

Figure 2:
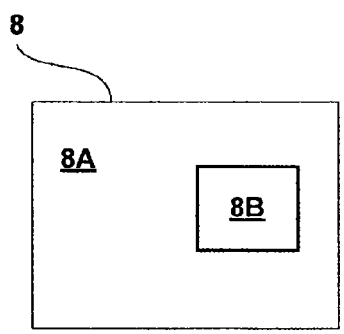
FIG. 2 is an image displayed by device 8 during a first mode of operation of an implementation of the FIG. 1 system.
Figure 3:
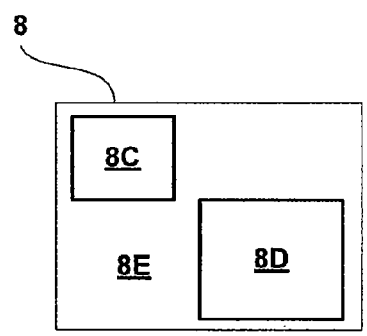
FIG. 3 is an image displayed by device 8 during a second mode of operation of an implementation of the FIG. 1 system.

Frame combining circuitry 13 of graphics unit 9 is coupled and configured to receive data from each frame buffer of memory 6. In order to produce a display on display device 8 only, circuitry 13 is operable to generate combined frames of display data from individual frames of display data (or portions of such individual frames) stored in the frame buffers of memory 6. For example, circuitry 13 can combine data from frame buffers 11 and 12 to generate a combined frame for display (on display device 8 as shown in FIG. 2) as a background image 8A (determined by a subset of a frame of display data stored in frame buffer 11) and a foreground image 8B (determined by all, or a subset, of a frame of display data stored in frame buffer 12). For another example, circuitry 13 can combine data from frame buffers 11 and 12 to generate a combined frame for display (on display device 8 as shown in FIG. 3) as image 8C (indicative of the entire frame of display data stored in frame buffer 11), image 8D (indicative of the entire frame of display data stored in frame buffer 12), and background 8E (which is not indicative of data stored in buffer 11 or 12). Background 8E can consist of monochrome pixels produced by circuitry 13.

In some implementations, circuitry 13 also performs filtering and/or downsampling on data from one or both of frame buffers 11 and 12. Typically, the filtered (or otherwise processed) version of data from one buffer are combined with data from the other buffer (or a processed version of data from the other buffer) and the combined data are asserted to device 8 for display. For example, to produce the FIG. 2 display, circuitry 13 could downsample an entire frame of data from buffer 12 to generate downsampled data that determine image 8B (so that image 8B is a smaller scale, lower-resolution version of the image determined by the frame stored in buffer 12), and combine the downsampled data with a subset of a frame stored in buffer 11 (without downsampling display data from buffer 11). Alternatively, GPU 4 is implemented to be capable of filtering and/or downsampling data asserted thereto by unit 9 from one or both of frame buffers 11 and 12, and GPU 4 asserts the filtered and/or downsampled data to circuitry 13 for use by circuitry 13 in generating combined frames.

Preferably, circuitry 13 operates under software control (e.g., under control of the operating system of CPU 2) to combine data from at least two frame buffers in any of a variety of formats and assert the resulting data to display device 8 to cause device 8 to simultaneously display data from multiple frame buffers in any of various relative positions (e.g., side by side, or in background-foreground relation with data from or determined by any of the frame buffers in the foreground). Preferably, circuitry 13 is also operable under software control to assert data from only one frame buffer at a time to display device 8, to cause device 8 to display data from only one of the frame buffers at a time.

Figure 4:
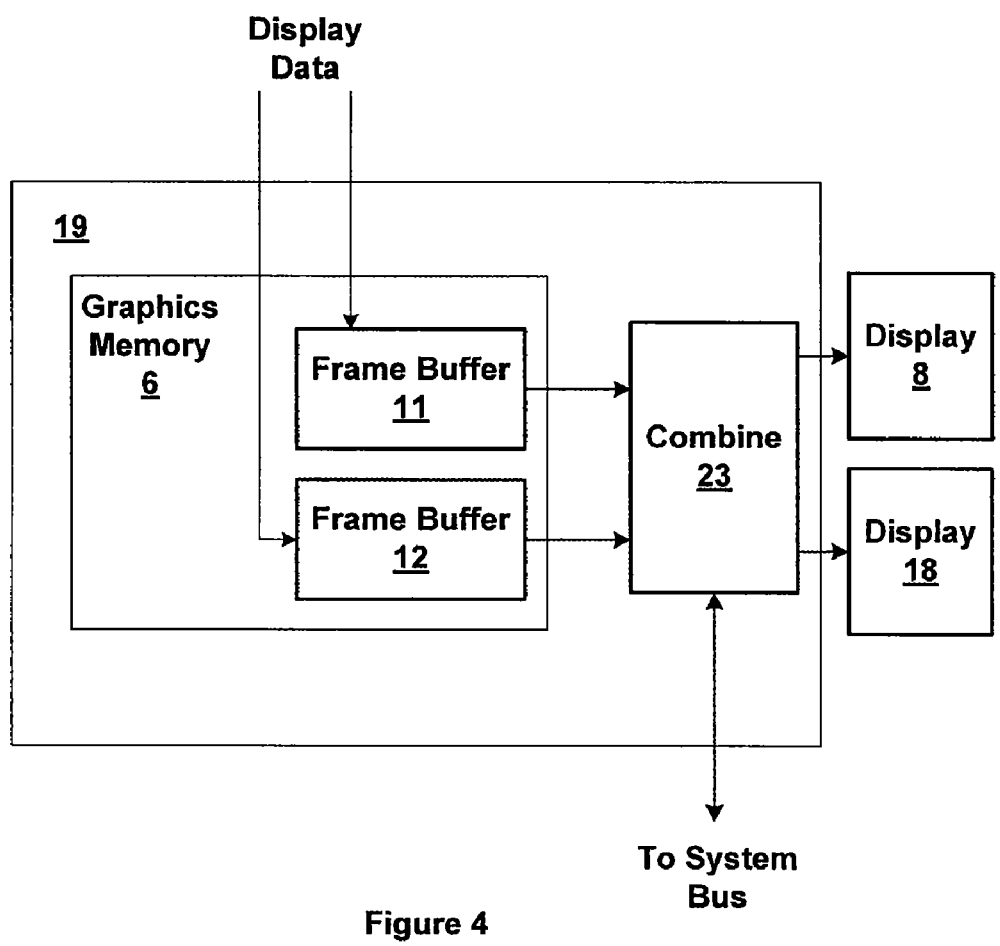
FIG. 4 is a block diagram of display devices and a graphics unit of another embodiment of the inventive system.

In other embodiments, the inventive system includes two or more display devices. For example, one such embodiment to be described with reference to FIG. 4 is identical to the FIG. 1 embodiment except in that graphics unit 9 of FIG. 1 is replaced by graphics unit 19 of FIG. 4, and two display devices (display devices 8 and 18 of FIG. 4) are coupled to graphics unit 19. Graphics memory 6 of graphics unit 19 is identical to memory 6 of graphics unit 9, display device 8 of FIG. 4 is identical to the identically numbered display device of FIG. 1, and the foregoing description of these elements will not be repeated with reference to FIG. 4.

Graphics unit 19 includes frame combining circuitry 23 which differs as follows from frame combining circuitry 13 of FIG. 1: circuitry 23 has operating modes identical to the above-described operating modes of circuitry 13 (in which data from frame buffers 11 and 12 are displayed, or filtered or otherwise processed and then displayed, simultaneously on display device 8); and circuitry 23 has additional operating modes in which data from frame buffer 11 are displayed (or filtered or otherwise processed and then displayed) on display device 8 and data from frame buffer 12 are simultaneously displayed (or filtered or otherwise processed and then displayed) on display device 18. In some of the latter modes, combiner 23 passes through display data from buffer 11 to display device 8 and passes through display data from buffer 12 to display device 18.

In each of the FIG. 1 and FIG. 4 embodiments, CPU 2 and GPU 4 are configured to perform multi-display operations in which CPU 2 asserts data and commands to GPU 4, and in response GPU 4 generates multiple frames of display data for simultaneous display. GPU 4 asserts each frame of display data to be displayed simultaneously to one of the frame buffers of memory 6. In the FIG. 4 embodiment and in preferred implementations of the FIG. 1 embodiment, CPU 2 and GPU 4 can perform the same multi-display operations in the case that the system displays data determined by two or more such frames (either the frame data, or a filtered or otherwise processed version of the frame data) simultaneously on a single display device (e.g., device 8) and in the case that the system displays data determined by N such frames (where N≧2) simultaneously on N display devices. Preferably, the graphics unit (e.g., unit 9 or 19) coupled to each display device recognizes (and distinguishes between) the conditions that: one display device is coupled to the graphics unit (in which case, data determined by at least two frame buffers are displayed on one display device); and at least two display devices are coupled to the graphics unit (in which case, each display device displays data determined by a different one of the frame buffers). Preferably, GPU 4 and CPU 2 "see" the same frame buffers under both of these conditions. Typically, the graphics unit employs driver software to distinguish between the two conditions and place the graphics unit in the proper operating mode for driving each display device appropriately.

As described, circuitry 13 of FIG. 1 is operable to assert data (sometimes referred to herein as an "image", since the data are indicative of an image) to a single display device (device 8) for display on a single display screen with data from (or determined by) each of at least two frame buffers of memory 6 displayed in different regions of the screen. In some implementations of the FIG. 1 system, circuitry 13 is configured such that either one or more than one display device can be coupled thereto, and circuitry 13 is operable in a mode (when more than one display device is coupled thereto) in which it asserts data from one frame buffer of memory 6 to a first display device and data from another frame buffer of memory 6 to a second display device. For example, one implementation of circuitry 13 is operable in a mode in which it asserts data from frame buffer 11 to display device 8 and asserts data from frame buffer 12 to a second display device (not shown in FIG. 1) coupled to receive such data, so that the data from both frame buffers can be simultaneously displayed on the two display devices.

In variations on the system of FIG. 1 or FIG. 4, two or more graphics processors are coupled between CPU 2 and memory 6 (rather than one graphics processor, GPU 4). Each graphics processor generates display data in response to data and commands from CPU 2, and each graphics processor asserts the display data generated thereby to a different frame buffer in memory 6.

In other variations on the system of FIG. 1 or FIG. 4, CPU 2 (rather than a graphics processor) generates multiple frames of display data for simultaneous display, and CPU 2 asserts each frame of display data to be displayed simultaneously to one of the frame buffers of memory 6.

Other variations on the system of FIG. 1 or FIG. 4 include more than one graphics memory and more than one frame buffer, and each of at least two of the frame buffers is an area of a different graphics memory.

In some implementations of the system of FIG. 1 (or FIG. 4), CPU 2, GPU 4, and graphics unit 9 (or 19) are configured to respond to an operating system alert by causing an indication of the alert (an "alert indication") to be displayed (e.g., on display device 8), either by automatically overlaying the alert indication on whatever image is being displayed, or by causing the displayed image to appear to pan to the alert indication (or otherwise causing sequential display of different portions of the image determined by data in the relevant frame buffer, with all or some of the later-displayed portions including the alert indication). In some implementations, units 2, 4, and 9 of FIG. 1 (or units 2 and 4, and unit 19 of FIG. 4) respond to an operating system alert by causing an alert indication to be displayed on one display screen in the position specified by the operating system. In some implementations in which two or more display devices are coupled to graphics unit 19 of FIG. 4, units 2, 4, and 19 are configured to respond to an operating system alert by causing an alert indication to be displayed on the screen of one of the display devices (e.g., device 8 only) in a position specified by the operating system. In other implementations, the alert indication is displayed in a position different from that specified by the operating system. An example of the latter class of implementations is an implementation of FIG. 1 in which only one display device (device 8) is coupled to graphics unit 9, data indicative of the alert indication are written to a third frame buffer in memory 6 (not frame buffer 11 or 12) that is not currently being viewed by the user, and the alert indication is then displayed on the screen in a position different from that specified by the operating system.

In some embodiments, the inventive system is operable in a mode in which graphics memory usage is automatically reduced (and preferably minimized) by causing at least one frame buffer to be no larger (or not significantly larger) than necessary to hold the data that can be displayed on a display screen (or available portion of a display screen). For example, in an implementation of the FIG. 1 system, only some of the data in each of frame buffers 11 and 12 can be displayed on a corresponding available portion of the screen of display device 8. This implementation of the FIG. 1 system includes hardware and/or software (e.g., programmable circuitry in GPU 4 or graphics unit 9) that filters (e.g., downsamples)

display data produced by pipelined processing circuitry 17 to reduce the volume of such data by a predetermined amount, and asserts the filtered data to a "reduced size" frame buffer in memory 6 (e.g., a version of frame buffer 11 or 12 having reduced size) from which the filtered data can be asserted to circuitry 13 for combination with other data and then display on the available portion of the screen of display device 8. Such "reduced size" frame buffer occupies less space in graphics memory 6 than would a frame buffer capable of holding the original, non-filtered display data.

In some embodiments of the inventive system, at least one of the frame buffers holds display data indicative of a virtual desktop that is larger than can be displayed on the screen (or available screen portion) of a display device, and the system is capable of displaying on the screen any of a number of different selected subsets of the data in each such frame buffer (each subset being indicative of a portal of the desktop). For example, preferred implementations of graphics unit 9 of FIG. 1 are configured to display different portions of a virtual desktop determined by data in frame buffer 11, by "zooming in" to display a magnified (enlarged) version of a smaller portion of the virtual desktop on an area of the screen of device 8 or "zooming out" to display a smaller scale (and typically lower-resolution) version of a larger portion of the virtual desktop in the same area of the screen. In some implementations, circuitry 13 of graphics unit 9 is configured to be capable of resizing (i.e., shrinking) an entire desktop determined by data in frame buffer 11 to fit on the screen (or available portion of the screen) of device 8, preferably by downsampling the data from the frame buffer.

It is within the scope of the invention to scale displayed texture in any of a variety of ways. For example, in some implementations of the FIG. 1 (or FIG. 4) system, pipelined processing circuitry 17 of GPU 4 has texture processing capability, graphics unit 9 sends to the texture processing subsystem of pipelined processing circuitry 17 each subset of frame buffer data (e.g., the frame buffer data in buffer 11 or 12) that is indicative of a portal to be displayed, and the texture processing subsystem of circuitry 17 filters (e.g., downsamples) each such subset of frame buffer data. GPU 4 asserts the resulting filtered data (which are typically indicative of a magnified or downsampled version of the data subset from the frame buffer) back to graphics memory 6, the filtered data are then asserted from memory 6 to circuitry 13, and circuitry 13 then asserts the filtered data to display device 8, optionally after combining the filtered data with other data or otherwise processing the filtered data.

Alternatively, graphics unit 9 includes a texture processing subsystem (e.g., a pipelined texture processing subsystem). The texture processing subsystem of unit 9 can be configured to filter (e.g., to downsample) each subset of frame buffer data (e.g., data in buffer 11 or 12) that is indicative of a portal to be displayed, and circuitry 13 can then assert the filtered data to display device 8.

Circuitry in a graphics processing unit (e.g., GPU 4) can be used to process display data that have been written to at least one frame buffer when the display data in at least one frame buffer are indicative of a virtual desktop that is larger than can be displayed on the screen. For example, in this case, texture processing circuitry in GPU 4 can be configured to filter (e.g., downsample) subsets of display data from each such frame buffer and GPU 4 can be configured to assert the resulting filtered data (which are typically indicative of downsampled versions of the subsets of display data) back to unit 9 for display on the screen of device 8. Circuitry in a graphics processing unit (e.g., GPU 4) can also be used to process display data that has been written to a frame buffer in systems (e.g., variations on the FIG. 1 system) in which a graphics unit (e.g., unit 9) displays data from only a single frame buffer on a display screen.

In some implementations of the FIG. 1 system, unit 9 is configured (or CPU 2 and unit 9 are configured) to allow a user to select (e.g., using input device 3) any of number of pre-defined "snap to" locations (portals) of a virtual desktop that the user sees on the screen of device 8, thus allowing the user to maneuver quickly within the virtual desktop. In some implementations, unit 9 is (or CPU 2 and unit 9 are) configured to allow a user to select (e.g., using input device 3) a de-magnified (shrunken) version of an entire virtual desktop for display (e.g., as a "popup window") in an area of the screen of device 8, and then to select (e.g., using input device 3) a location for a portal of the desktop (to be displayed on the screen) by selecting a region (e.g., a shrunken icon) within the de-magnified version of the entire desktop.

In some systems (e.g., some variations on the FIG. 1 system) in which a graphics unit (e.g., unit 9) displays data from only a single frame buffer on a display screen, and the frame buffer holds display data indicative of a virtual desktop that is larger than can be displayed on the screen, the graphics unit is capable of displaying on the screen any of a number of different selected subsets of the data in the frame buffer (each subset being indicative of a different portal of the desktop), and the graphics unit is configured (or the graphics unit and a CPU coupled thereto are configured) to allow a user to select (e.g., using an input device) any of one or more pre-defined "snap to" locations in the desktop, thus allowing the user to maneuver quickly within the virtual desktop. For example, some implementations of variations on the FIG. 1 system in which graphics unit 9 displays data from a single frame buffer on a display screen (e.g., the screen of display device 8), the frame buffer holds display data indicative of a virtual desktop that is larger than can be displayed on the screen, the system is capable of displaying on the screen any of a number of different selected subsets of the data in the frame buffer (each subset being indicative of a different portal of the desktop), and the user can cause a de-magnified version of the entire virtual desktop to appear in an area of the screen (e.g., as a "popup window") and can then select a location for a portal of the desktop (to be displayed) by selecting a region within the de-magnified version of the entire desktop.

Some implementations of the FIG. 1 system include a windowing system which allows convenient resizing of a displayed portal of a virtual desktop or convenient display of a different portal of a virtual desktop. Preferably, unit 9 is configured (or CPU 2 and unit 9 are configured) to respond to user selection of a feature of the windowing system by resizing a displayed portal of a virtual desktop or displaying a different portal of a virtual desktop. For example, the system can be configured to display automatically a sequence of progressively larger versions of a portal when the user manipulates input device 3 to "press" a displayed cursor against an edge of the screen region (e.g., popup window) in which the portal is displayed. For another example, the system can be configured so that when the user manipulates input device 3 to scroll (or autoscroll) within a screen region in which a portal is displayed, a sequence of different portals are displayed with the appearance that the displayed portal is moving to a part of the desktop to which the user is scrolling.

Some implementations of the FIG. 1 system respond to selection of a control by automatically changing characteristics of a displayed image (from one of the frame buffers) to a set of predefined characteristics. For example, CPU 2, graphics unit 9, and input device 3 can be configured so that device 3 includes at least one user-definable control (e.g., at least key having programmable functions, where device 3 is a keyboard) and CPU 2 and unit 9 are configured to respond to user selection of each such control by automatically changing characteristics of a displayed image (from one frame buffer of memory 6) to a set of predefined characteristics. For example, if device 3 is a keyboard, in response to user actuation of a user-defined key of device 3, CPU 2 and unit 9 can display a predetermined portal (a predetermined part of a virtual desktop) in place of another displayed portal (another part of the virtual desktop). Actuation of another control (e.g., another user-defined key of device 3) can cause CPU 2 and unit 9 to display a portal with a predetermined size, in place of a larger or smaller version of the same portal that is being displayed when the control is actuated. For another example, the system allows a user to specify a list of portal sizes and locations and to program the system to invoke each portal size and location on the list by actuating one of a set of user-defined controls (e.g., actuating a user-defined key or sequence of keys of device 3 when device 3 is a keyboard, or selecting an item from a user-determined, displayed menu when device 3 is a mouse). In the latter example, the system is configured to invoke each item in the list (thereby displaying a portal having a specific predetermined size in a specific predetermined position on the screen) in response to actuation of one or more of the user-defined controls (e.g., in response to user selection of a "shortcut" by a combination of keystrokes or a selection from a popup menu).

In some implementations of a variation on the FIG. 1 system in which graphics unit 9 displays data from a single frame buffer on a display screen (e.g., the screen of display device 8), and the frame buffer holds display data indicative of a virtual desktop that is larger than can be displayed on the screen, graphics unit 9 is (or CPU 2 and graphics unit are) capable of displaying on the screen any of a number of different selected subsets of the data in the frame buffer (each subset being indicative of a different portal of the desktop). The user can cause a de-magnified version of the entire virtual desktop to appear in an area of the screen (e.g., as a popup window) and can then manipulate an input device (e.g., device 3) to select a location for a portal of the desktop (to be displayed) by selecting a region within the de-magnified version of the entire desktop.

Some implementations of variations on the FIG. 1 system in which graphics unit 9 displays data from a single frame buffer on a display screen (e.g., the screen of display device 8), and the frame buffer holds display data indicative of a virtual desktop that is larger than can be displayed on the screen, include a windowing system which allows convenient resizing of a displayed portal of the virtual desktop or convenient display of a different portal of the virtual desktop. Preferably, unit 9 is configured (or CPU 2 and unit 9 are configured) to respond to user selection of a feature of the windowing system by resizing a displayed portal of the virtual desktop or displaying a different portal of the virtual desktop. For example, the system can be configured to display automatically a sequence of progressively larger versions of a portal when the user manipulates input device 3 to "press" a displayed cursor against an edge of the screen region (e.g., popup window) in which the portal is displayed. For another example, the system can be configured so that when the user manipulates input device 3 to scroll (or autoscroll) within a screen region in which a portal is displayed, a sequence of different portals are displayed with the appearance that the displayed portal is moving to a part of the desktop to which the user is scrolling.

Some implementations of variations on the FIG. 1 system in which graphics unit 9 displays data from a single frame buffer on a display screen (e.g., the screen of display device 8), and the frame buffer holds display data indicative of a virtual desktop that is larger than can be displayed on the screen, respond to selection of a control by automatically changing characteristics of a displayed image (determined by data from the frame buffer) to a set of predefined characteristics. For example, CPU 2, graphics unit 9, and input device 3 of such a system can be configured so that device 3 includes at least one user-definable control (e.g., at least key having programmable functions, where device 3 is a keyboard) and CPU 2 and unit 9 are configured to respond to user selection of each such control by automatically changing characteristics of a displayed image (from one frame buffer of memory 6) to a set of predefined characteristics. For example, if device 3 is a keyboard, in response to user actuation of a user-defined key of device 3, CPU 2 and unit 9 can display a predetermined portal (a predetermined part of the virtual desktop) in place of another displayed portal (another part of the virtual desktop). Actuation of another control (e.g., another user-defined key of device 3) can cause CPU 2 and unit 9 to display a portal with a predetermined size, in place of a larger or smaller version of the same portal that is being displayed when the control is actuated. For another example, the system allows a user to specify a list of portal sizes and locations and to program the system to invoke each portal size and location on the list by actuating one of a set of user-defined controls (e.g., actuating a user-defined key or sequence of keys of device 3 when device 3 is a keyboard, or selecting an item from a user-determined, displayed menu when device 3 is a mouse). In the latter example, the system is configured to invoke each item in the list (thereby displaying a portal having a specific predetermined size in a specific predetermined position on the screen) in response to actuation of one or more of the user-defined controls (e.g., in response to user selection of a "shortcut" by a combination of keystrokes or a selection from a popup menu).

The graphics unit of the invention (e.g., unit 9 of FIG. 1 or unit 19 of FIG. 4) can be a single chip, but typically is implemented as a single graphics card (with different elements implemented in different chips of the card). Alternatively, different elements of the graphics unit are implemented in different graphics cards, with one of the cards including circuitry (which can be coupled to a single display device) for combining data from different frame buffers associated with the cards for display on one screen.

Other aspects of the invention are graphics units for use in any embodiment of the inventive system, and methods implemented by any embodiment of the inventive system.

It should be understood that while certain forms of the invention have been illustrated and described herein, the invention is not to be limited to the specific embodiments described and shown.

What is claimed is:

1. A computer system, including:
   a processor;
   a display device having a display screen; and
   a graphics unit coupled to the display device and including graphics memory that defines at least two frame buffers, said at least two frame buffers holding a virtual desktop image that cannot be entirely displayed on the display screen, wherein the graphics unit is configured to assert multiple sets of filtered display data to the display device, each of the sets of filtered display data is computed from a different subset of the display data in the at least two frame buffers and is associated with a different portal of the virtual desktop image, each portal is configurable to correspond to any region of the virtual desktop image, and the graphics unit and the processor are configured to assert to the display device a sequence of said sets of filtered display data to cause the display device to display images of portals that appear to move from a first portion of the virtual desktop image to a second portion of the virtual desktop image, wherein the processor is configured to perform multi-display operations in which the processor independently generates multiple frames of display data for simultaneous display and asserts the frames to the graphics unit, and the graphics unit is configured to store the frames in the frame buffers and to assert display data determined by at least a subset of the display data in each of the frame buffers to the display device for simultaneous display.

2. The system of claim 1, wherein the graphics unit is configured to assert the sequence of the sets of filtered display data to cause the display device to display images that appear to zoom out from the first portion of the virtual desktop image displayed on a region of the display screen to the second portion of the virtual desktop image displayed on the same region of the display screen.

3. The system of claim 1, wherein the graphics unit is configured to assert the sequence of the sets of filtered display data to cause the display device to display images that appear to zoom in to the second portion of the virtual desktop image displayed on a region of the display screen from the first portion of the virtual desktop image displayed on the same region of the display screen.

4. The system of claim 1, wherein the graphics unit is configured to send one or more of said subsets of the display data from the at least two frame buffers holding the virtual desktop image to the processor and to cause the processor to generate at least some of the sets of filtered display data.

5. The system of claim 1, wherein the processor has a texture processing subsystem, and the graphics unit is configured to send at least one of said subsets of the display data from the at least two frame buffers holding the virtual desktop image to the texture processing subsystem and to cause the texture processing subsystem to generate at least some of the sets of filtered display data.

6. The system of claim 5, wherein the texture processing subsystem is configured to downsample said at least one of said subsets of the display data from the at least one frame buffer to generate a reduced amount of data.

7. A computer system, including:
a processor;
a display device having a display screen; and
a graphics unit coupled between the processor and the display device, wherein the graphics unit includes graphics memory that defines at least two frame buffers, at least one of the frame buffers holds a virtual desktop image that cannot be entirely displayed on the display screen, the graphics unit is configured to assert, to the display device, a first set of filtered display data being computed from a first subset of the display data in said at least one of the frame buffers and that is associated with a first portal of the virtual desktop image, wherein the first portal is configurable to correspond to any region of the virtual desktop image, and the processor and the graphics unit are configured to respond to at least one control signal during or after assertion of the first set of filtered display data to the display device, by asserting to the display device a second set of filtered display data being computed from a second subset of the display data in said at least one of the frame buffers and that is associated with either a second portal of the virtual desktop or a resized version of the first portal of the virtual desktop, wherein each of the second portal and the resized version of the first portal is configurable to correspond to any region of the virtual desktop image, and wherein the processor is configured to perform multi-display operations in which the processor independently generates multiple frames of display data for simultaneous display and asserts the frames to the graphics unit, and the graphics unit is configured to store the frames in the frame buffers and to assert display data determined by at least a subset of the display data in each of the frame buffers to the display device for simultaneous display.

8. The system of claim 7, also including:
a programmable control, coupled and configured to assert the at least one control signal to the processor in response to user actuation of said control.

9. The system of claim 8, wherein the control is a set of one or more keyboard keys that have been programmed to assert the control signal in response to a keystroke or combination of keystrokes.

10. The system of claim 7, wherein said first subset of the display data is associated with the first portal of the virtual desktop image and is also indicative of a portal of a second virtual desktop image, and said second subset of the display data is also indicative of the portal of the second virtual desktop image.

11. The system of claim 7, wherein the display device displays an image of the second portal at a predetermined location on the display screen in response to said second set of filtered display data.

12. A computer system, including:
a processor;
a display device having a display screen; and
a graphics unit coupled between the processor and the display device,
wherein the graphics unit includes graphics memory that defines at least two frame buffers, at least one of the frame buffers holds a virtual desktop image that cannot be entirely displayed on the display screen, the graphics unit is configured to assert, to the display device, a first set of filtered display data being computed from a first subset of the display data in said at least one of the frame buffers and that is associated with a first portal of the virtual desktop image, the processor and the graphics unit are configured to respond to at least one control signal during or after assertion of the first set of filtered display data to the display device, by asserting to the display device a second set of filtered display data being computed from a second subset of the display data in said at least one of the frame buffers and that is associated with a second portal of the virtual desktop at a predetermined location of said virtual desktop image, wherein the second portal is configurable to correspond to any region of the virtual desktop image, and wherein the processor is configured to perform multi-display operations in which the processor independently generates multiple frames of display data for simultaneous display and asserts the frames to the graphics unit, and the graphics unit is configured to store the frames in the frame buffers and to assert display data determined by at least a subset of the display data in each of the frame buffers to the display device for simultaneous display.

13. The system of claim 12, wherein said first subset of the display data indicative of the first portal of the virtual desktop image is also indicative of a portal of a second virtual desktop image, and said second subset of the display data is also indicative of the portal of the second virtual desktop image.

14. A graphics unit for use in a computer system, the computer system including a display device having a display screen and a processor configured to generate frames of display data, said graphics unit including:
- at least one input configured to be coupled to the processor for receiving the frames;
- at least one output configured to be coupled to the display device;
- graphics memory defining at least a first frame buffer and a second frame buffer, wherein at least one of the first frame buffer and the second frame buffer is capable of holding a virtual desktop image that cannot be entirely displayed on the screen; and
- additional circuitry coupled to the graphics memory and to the at least one output, wherein the additional circuitry is configured to assert, to the at least one output, a first set of filtered display data being computed from a first subset of the display data in the first frame buffer and that is associated with a first portal of the virtual desktop image, and the additional circuitry is configured to respond to at least one control signal during or after assertion of the first set of filtered display data to the at least one output, by asserting to the at least one output, a second set of filtered display data being computed from a second subset of the display data in at least one of the first frame buffer and the second frame buffer and that is associated with either a second portal of the virtual desktop image or a resized version of the first portal of the virtual desktop image, wherein each of the second portal and the resized version of the first portal is configurable to correspond to any region of the virtual desktop image.

15. A graphics unit for use in a computer system, the computer system including a display device having a display screen and a processor configured to generate frames of display data, said graphics unit including:
- at least one input configured to be coupled to the processor for receiving the frames;
- at least one output configured to be coupled to the display device;
- graphics memory defining at least a first frame buffer and a second frame buffer, wherein at least one of the first frame buffer and the second frame buffer is capable of holding a virtual desktop image that cannot be entirely displayed on the screen; and
- additional circuitry, coupled to the graphics memory and configured to assert, to at least one output, a first set of filtered display data being computed from a first subset of the display data in the first frame buffer and that is associated with a first portal of the virtual desktop image, wherein the first portal is configurable to correspond to any region of the virtual desktop image,
- wherein the additional circuitry is configured to respond to at least one control signal during or after assertion of the first set of filtered display data to the at least one output, by asserting to the at least one output a second set of filtered display data being computed from a second subset of the display data in the first frame buffer and that is associated with a second portal of the virtual desktop image at a predetermined location of said virtual desktop image,
- wherein the additional circuitry is also configured to assert, to the at least one output for simultaneous display, display data determined by at least a subset of a frame of data in the first frame buffer and indicative of the first portal of the virtual desktop image, and display data determined by at least a subset of a frame of data in the second frame buffer and indicative of a portal of a second virtual desktop image, wherein the second portal is configurable to correspond to any region of the virtual desktop image.

16. The graphics unit of claim 15, wherein the additional circuitry is configured to respond to at least one other control signal during or after assertion of the second set of filtered display data to the at least one output, by asserting to the at least one output a third set of filtered display data indicative of the portal of the second virtual desktop image.

17. A method for displaying data indicative of a virtual desktop image on a display device having a display screen, said display screen having an available area for displaying the data indicative of the virtual desktop image, said method comprising the steps of:
- (a) storing display data in a frame buffer to cause the frame buffer to hold the virtual desktop image, wherein the virtual desktop image cannot be entirely displayed on the display screen; and
- (b) asserting a sequence of sets of filtered display data to the display device, wherein each of the sets is computed from a different subset of the display data in the frame buffer and is associated with a portal of the virtual desktop image, and each portal is configurable to correspond to any region of the virtual desktop,
- wherein step (b) includes the steps of sending at least one of said subsets of the display data from the frame buffer to a processor, filtering the at least one of said subsets of the display data in the processor to generate filtered display data, performing multi-display operations in the processor for generating multiple frames of filtered display data for simultaneous display, storing the filtered display data in a graphics memory, and asserting at least some of the filtered display data from the graphics memory to the display device.

* * * * *